D. GAIBIS.
AUTOMATIC REGISTERING AND CHANGE DEVICE.
APPLICATION FILED DEC. 16, 1912.

1,089,206.

Patented Mar. 3, 1914.

Witnesses

Inventor
David Gaibis.

By Wilkinson Witherspoon
& Mackaye
Attorneys.

D. GAIBIS.
AUTOMATIC REGISTERING AND CHANGE DEVICE.
APPLICATION FILED DEC. 16, 1912.

1,089,206.

Patented Mar. 3, 1914.
7 SHEETS—SHEET 3.

D. GAIBIS.
AUTOMATIC REGISTERING AND CHANGE DEVICE.
APPLICATION FILED DEC. 16, 1912.

1,089,206.

Patented Mar. 3, 1914.

Witnesses

Inventor
David Gaibis,
By Wilkinson Witherspoon
& Mackaye
Attorneys

D. GAIBIS.
AUTOMATIC REGISTERING AND CHANGE DEVICE.
APPLICATION FILED DEC. 16, 1912.

1,089,206.

Patented Mar. 3, 1914.
7 SHEETS—SHEET 6.

Witnesses
Chas. K. Griesbauer.
H. W. Primm

Inventor
David Gaibis,

By Wilkinson, Witherspoon
& Mackaye,
Attorneys

D. GAIBIS.
AUTOMATIC REGISTERING AND CHANGE DEVICE.
APPLICATION FILED DEC. 16, 1912.

1,089,206.

Patented Mar. 3, 1914.
7 SHEETS—SHEET 7.

Witnesses

Inventor
David Gaibis
By
Wilkinson Witherspoon
& Mackaye
Attorneys.

UNITED STATES PATENT OFFICE.

DAVID GAIBIS, OF NEW CASTLE, PENNSYLVANIA.

AUTOMATIC REGISTERING AND CHANGE DEVICE.

1,089,206.  Specification of Letters Patent.  Patented Mar. 3, 1914.

Application filed December 16, 1912. Serial No. 737,049.

*To all whom it may concern:*

Be it known that I, DAVID GAIBIS, a citizen of the United States, residing at New Castle, in the county of Lawrence and State of Pennsylvania, have invented certain new and useful Improvements in Automatic Registering and Change Devices; and I do hereby declare the following to be a full, clear, and exact description of the invention, such as will enable others skilled in the art to which it appertains to make and use the same.

My invention relates to automatic registering and change devices, and it consists in the constructions, combinations and arrangements herein described and claimed.

An object of my invention is to provide an improved registering and change device especially adapted for efficient and convenient use in cars of the pay-as-you-enter type.

A further object of my invention is to provide a simple and compact registering and change device adapted to operate with certainty, to automatically register all fares deposited therein, and to deliver correct change for all coins of larger denominations than the amount of such fare.

In the accompanying drawings forming a part of this application, and in which similar reference symbols indicate corresponding parts in the several views: Fig. 4 is a section on the line 4—4 of Fig. 3.

Figure 1:
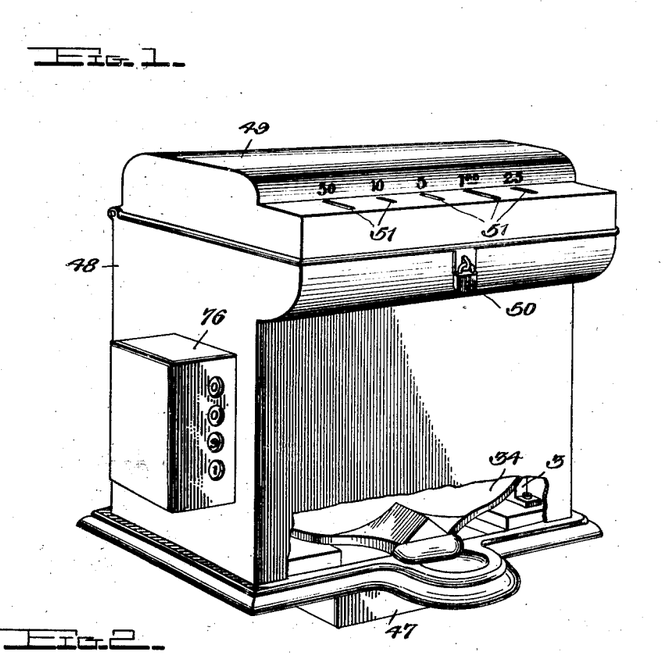
Figure 1 is a perspective view, with the front casing wall partly broken away, illustrating one embodiment of my invention.
Figure 2:
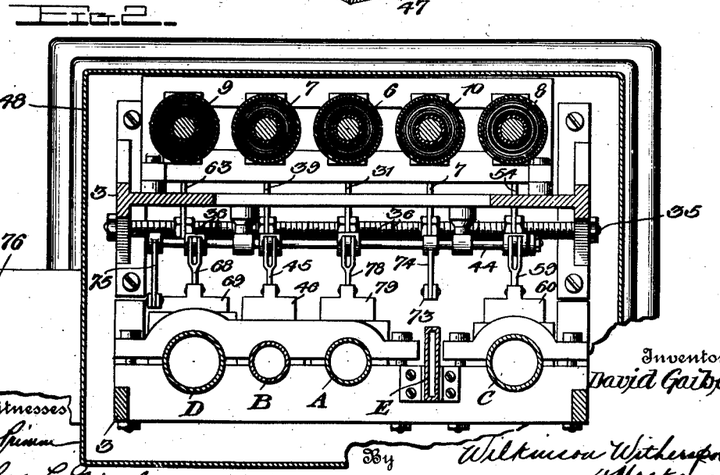
Fig. 2 is a section on the line 2—2 of Fig. 4.
Figure 3:
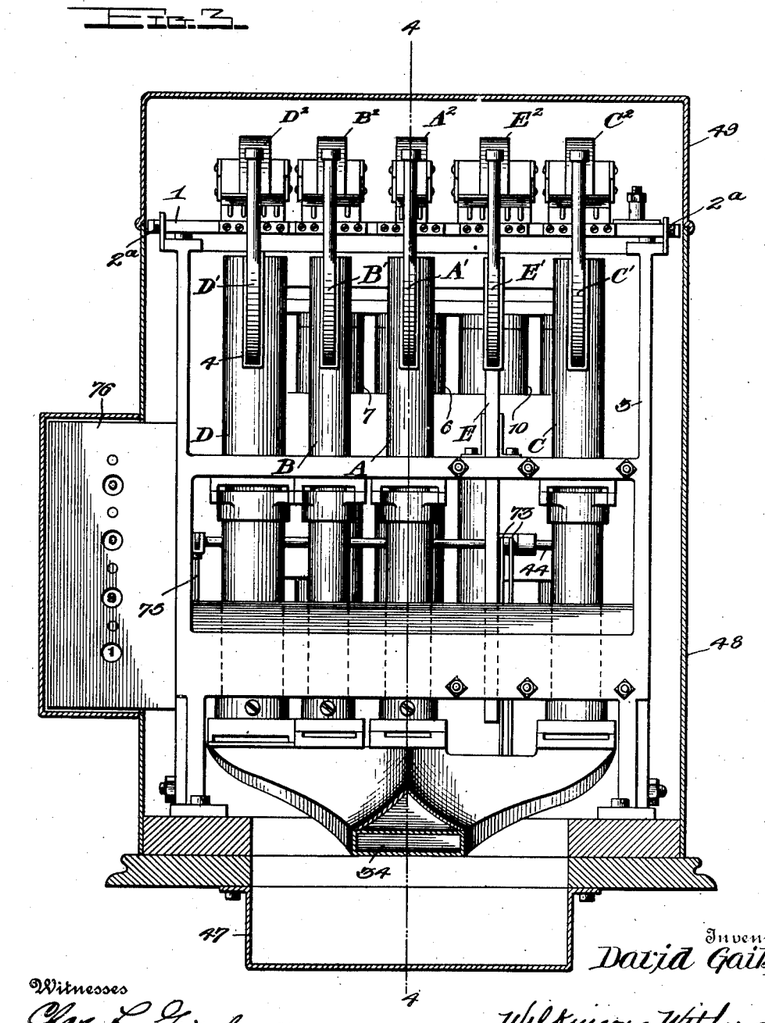
Fig. 3 is a front elevation of the construction shown in Fig. 1, with the casing in section.
Figure 5:
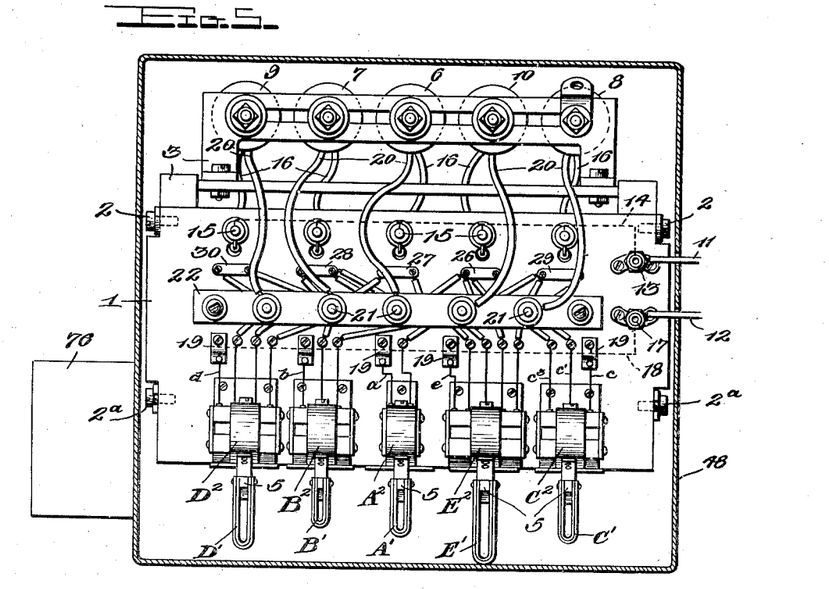
Fig. 5 is a plan view of the interior construction, with the casing shown in section.
Figure 6:
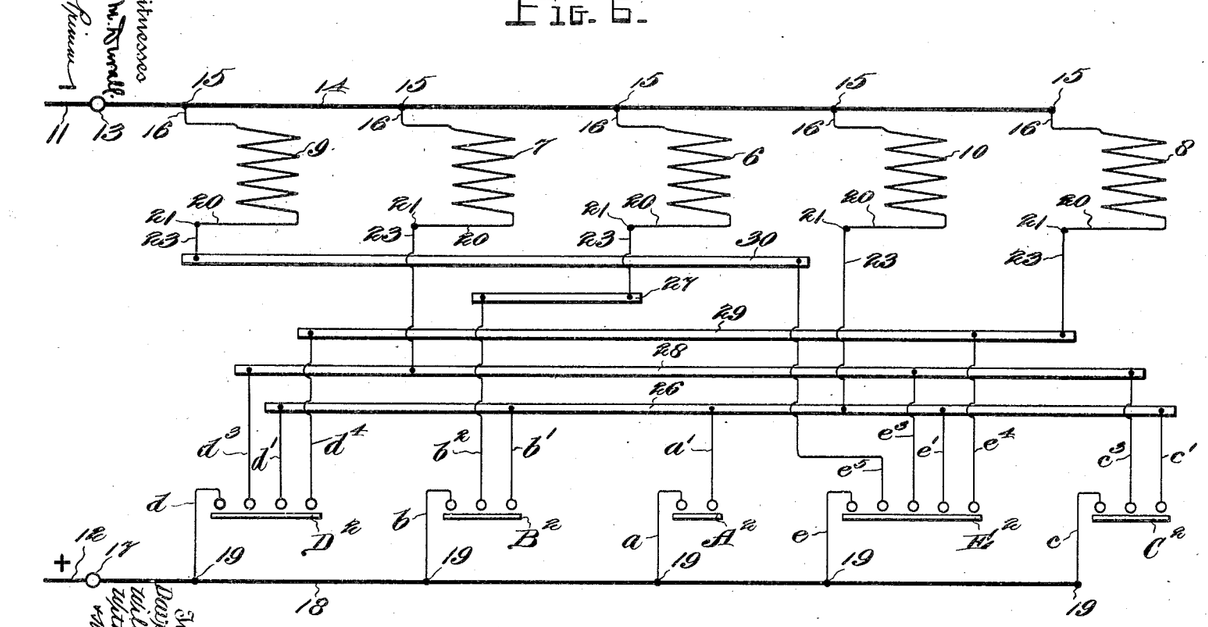
Fig. 6 is a diagrammatic view, illustrating the electrical connections between the several switches and solenoids.
Figure 7:
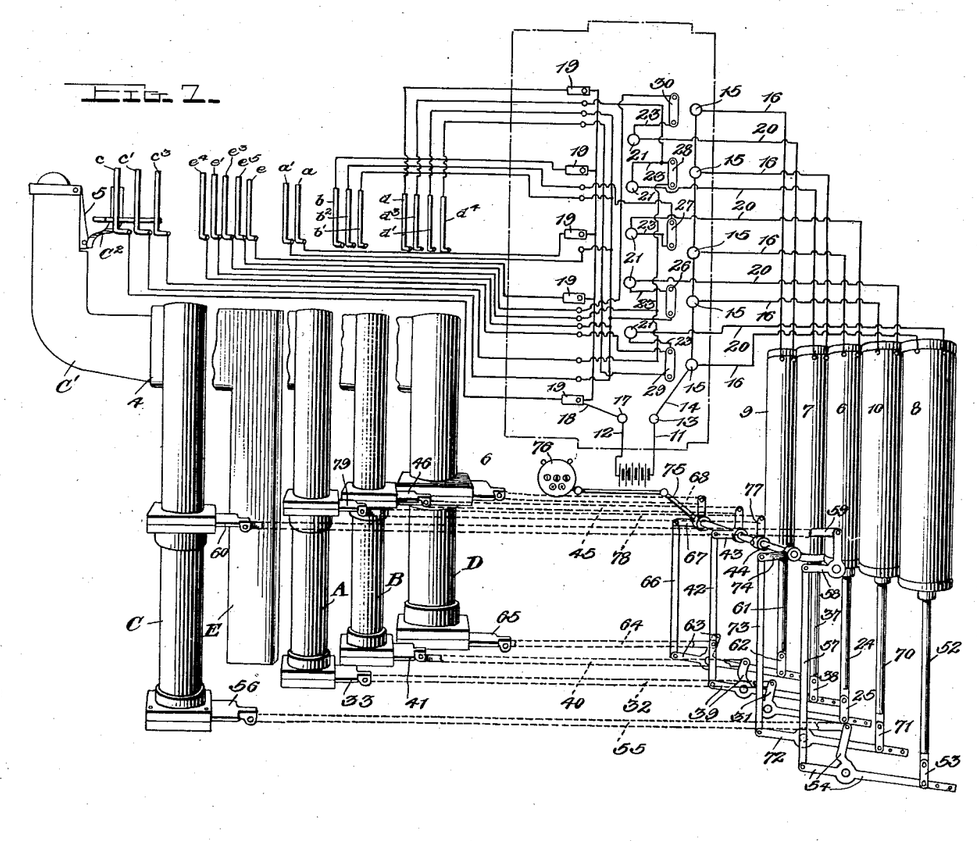
Fig. 7 is a diagrammatic view, illustrating the electric circuits of the solenoids and the mechanism operated by the latter.
Figure 8:
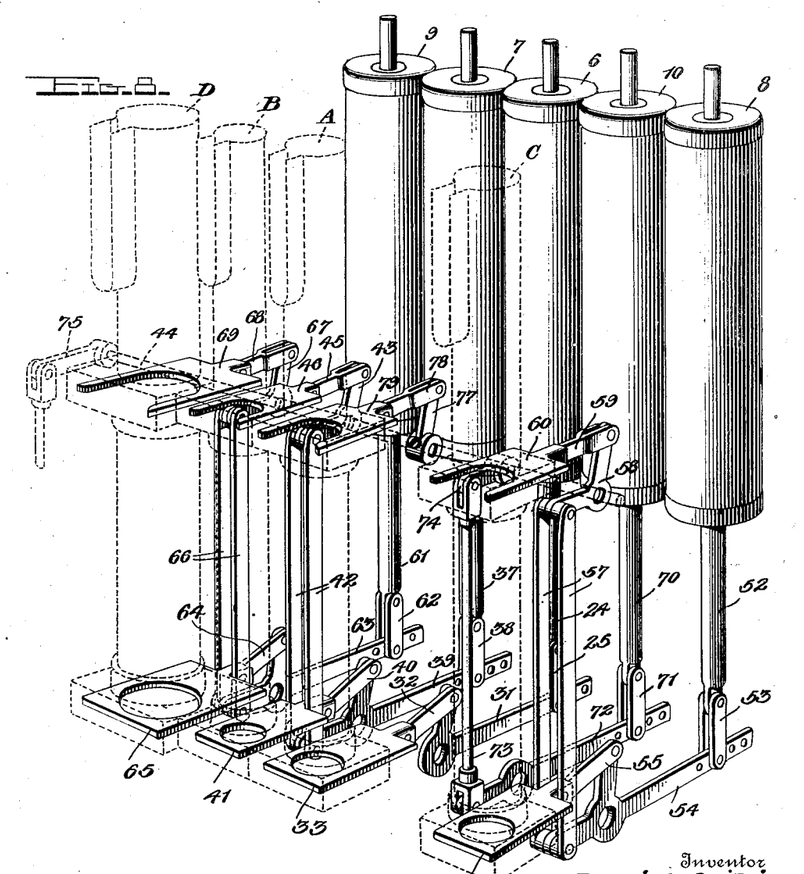
Fig. 8 is a fragmentary perspective view of the several solenoids and the connections actuated thereby; the positions of the coin receptacles being indicated in broken lines.
Figure 9:
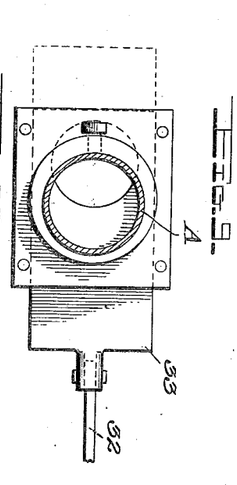
Fig. 9 is a horizontal section of the coin receptacle A slightly above its lower slide.
Figure 10:
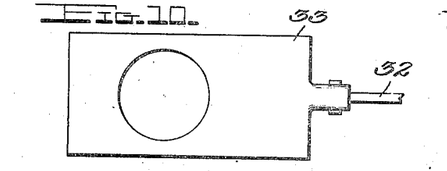
Fig. 10 is a plan view of the slide shown in Fig. 9.
Figure 11:
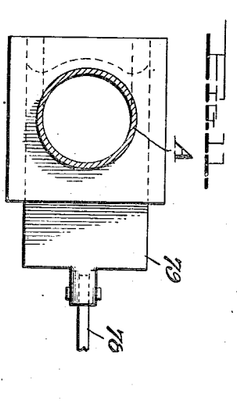
Fig. 11 is a horizontal section of the coin receptacle A at a point above its upper slide.
Figure 12:
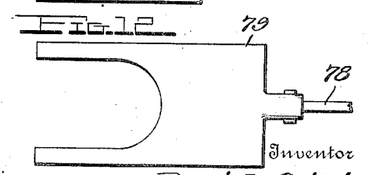
Fig. 12 is a plan view of the slide shown in Fig. 11.

Referring to the drawings, A, B, C, and E indicate receptacles for coins of different denominations, such as, five cents, ten cents, twenty-five cents, fifty cents, and one dollar, respectively. A plate 1 of wood, or other electrical insulating material, is hinged at 2 on an upright frame 3, and carries a series of chutes $A^1$, $B^1$, $C^1$, $D^1$ and $E^1$ adapted to swing into registry with the flanged openings 4 in the several receptacles for delivering coins thereto; said chutes being provided with slotted rear walls and with pendent levers 5 adapted to be swung therethrough by coins inserted in the respective chutes. The hinged plate 1 is detachably locked by screws $2^a$ in position above the open upper ends of the coin receptacles. A series of spring switch members $A^2$, $B^2$, $C^2$, $D^2$ and $E^2$ are mounted on the swinging plate 1, and normally maintained in open position against said slotted rear walls of the respective chutes; said resilient switches being adapted to be shifted to closed position by the pendent levers 5 upon the insertion of coins in said chutes. A series of solenoids 6, 7, 8, 9 and 10 are secured to the upright frame 3, and connected through said switches with the leads 11 and 12 of any suitable electrical source. The lead 11 is attached to a binding post 13 in electrical connection by a wire 14 and binding posts 15 with one terminal 16 of each solenoid; see especially Figs. 5, 6 and 7. The lead 12 is attached to a binding post 17 in electrical connection by a wire 18 and binding plates 19 with one branch *a*, *b*, *c*, *d* and *e* of the respective switches; said binding posts 13, 15 and 17 being shown mounted on the swinging insulating plate 1.

The core 24 of the solenoid 6 is adjustably connected by a link 25 with a bell-crank lever 31, which latter is connected by a link 32 with a slide 33 mounted in the bottom of the receptacle A for delivering a coin therefrom into a change spout 34 extending beneath the several coin receptacles; said lever 31 being adjustably threaded on a short screw sleeve 36 rotatably mounted on a fixed spindle 35, and normally maintained in position with the slide 33 withdrawn by the weight of said core 24.

The core 37 of the solenoid 7 is adjustably connected by a link 38 with a three-arm lever 39 similarly mounted on the fixed spindle 35, and having one of its arms connected by a link 40 with a slide 41 in the bottom of the receptacle B for simultaneously delivering two coins therefrom to the change spout 34; the other arm of said lever 39 being connected by a link 42 to a bell-crank lever 43 rotatably mounted on an upper shaft 44 and connected by a link 45 with an upper slide 46 in said receptacle B for discharging surplus coins therefrom to any suitable receptacle 47. The receptacle 47 communicates with the bottom of a main casing 48 having a hinged top 49 adapted to be secured by a lock 50 and provided with slots 51 registering with the several chutes $A^1$, $B^1$, $C^1$, $D^1$ and $E^1$.

The core 52 of the solenoid 8 is adjustably connected by a link 53 with a three-arm lever 54 adjustably secured on a similar short screw sleeve 36 rotatably mounted on the fixed spindle 35, and having one of its arms connected by a link 55 with a slide 56 in the bottom of the receptacle C for delivering a coin therefrom to the change spout 34; the other arm of said lever 54 being connected by a link 57 to a bell-crank lever 58 rotatably mounted on the upper shaft 44 and connected by a link 59 with an upper slide 60 in said receptacle C for discharging surplus coins therefrom to the receptacle 47.

The core 61 of the solenoid 9 is adjustably connected by a link 62 with a three-arm lever 63 mounted on a similar short screw sleeve rotatably mounted on the fixed spindle 35, and having one of its arms connected by a link 64 with a slide 65 in the bottom of the receptacle D for delivering a coin therefrom to the change spout 34; the other arm of said lever 63 being connected by a link 66 with a bell-crank lever 67 rotatably mounted on the upper shaft 44 and connected by a link 68 with an upper slide in said receptacle D for discharging surplus coins therefrom to the receptacle 47.

The core 70 of the solenoid 10 is adjustably connected by a link 71 with a lever 72 adjustably threaded on a short screw sleeve 36 rotatably mounted on the fixed spindle 35, and having its other end connected by a link 73 with a crank 74 rigidly secured on the upper shaft 44, as by a set screw. The shaft 44 has also rigidly secured thereto a crank 75 for actuating any usual type of registering device 76, and a crank 77 connected by a link 78 with an upper slide 79 in the receptacle A for discharging surplus coins therefrom to the receptacle 47; whereby said slide 79 and registering device 76 will be actuated upon energization of the solenoid 10.

The receptacle E for coins of the highest denomination, which is one dollar in this series, is provided with an open bottom for discharging all coins deposited therein in the receptacle 47. The other terminals 20 of the respective solenoids 6, 7, 8, 9 and 10 are connected as follows: solenoid 10 to a binding plate 26, solenoid 6 to a binding plate 27, solenoid 7 to a binding plate 28, solenoid 8 to a binding plate 29, and solenoid 9 to a binding plate 30.

The binding plate 26 is electrically connected to the branches $a^1$, $b^1$, $c^1$, $d^1$ and $e^1$ of the switches $A^2$, $B^2$, $C^2$, $D^2$ and $E^2$, whereby the closure of any of said switches by the insertion of a coin in the corresponding chute $A^1$, $B^1$, $C^1$, $D^1$ or $E^1$ will energize the solenoid 10 and raise the core 70 thereof; thereby shifting the lever 72, link 73, and crank 74 to swing the upper shaft 44, and the cranks 75 and 77 rigidly secured on said shaft 44 will, respectively, actuate the registering device 76 and the upper slide 79 in the receptacle A for discharging any surplus nickel from the latter.

The binding plate 27 is electrically connected to the branch $b^2$ of the switch $B^2$, whereby the closure of said switch by the insertion of a dime in the chute $B^1$ will energize the solenoid 6 and raise the core 24 thereof; thereby shifting the crank 31 and link 32 to actuate the lower slide 33 for delivering a nickel from the receptacle A to the change spout 34. This action is simultaneous with the above-described actuation of the register 76 and upper slide 79 produced by energization of the solenoid 10 upon closure of the switch branch $b^1$.

The binding plate 28 is electrically connected to the branches $c^3$, $d^3$ and $e^3$ of the switches $C^2$, $D^2$ and $E^2$, whereby the closure of any of said switches by the insertion of a coin in the corresponding chute $C^1$, $D^1$ or $E^1$ will energize the solenoid 7 and raise the core 37 thereof; thereby shifting the lever 39, bell-crank lever 43, and links 40, 42 and 45 to actuate the slide 46 for discharging any surplus dime from the receptacle B, and the slide 41 for delivering two dimes from said receptacle B to the change spout 34. This action is simultaneous with the above-described actuation of the register 76 and upper slide 79 produced by energization of the solenoid 10 upon closure of the corresponding switch branches $c^1$, $d^1$ or $e^1$.

The binding plate 29 is electrically connected to the branches $d^4$ and $e^4$ of the switches $D^2$ and $E^2$, whereby the closure of either of said switches by the insertion of a coin in the corresponding chute $D^1$ or $E^1$ will energize the solenoid 8 and raise the core 52 thereof; thereby shifting the lever 54, bell-crank lever 58, and links 55, 57 and 59 to actuate the slide 60 for discharging a surplus quarter from the receptacle C, and the slide 56 for delivering a quarter from said receptacle C to the change spout 34. This action is simultaneous with the above-described actuation of the register 76 and upper slide 79 produced by energization of the solenoid 10 upon closure of the switch branches $d^1$ or $e^1$, and with the above-described actuation of the slides 41 and 46 produced by energization of the solenoid 7 upon closure of the switch branches $d^3$ or $e^3$ for discharging a surplus dime from the receptacle B and delivering two dimes from said receptacle to the change spout 34.

The binding plate 30 is electrically connected to the branch $e^5$ of the switch $E^2$, whereby the closure of said switch by the insertion of a dollar coin in the chute $E^1$ will energize the solenoid 9 and raise the core 61 thereof; thereby shifting the lever 63, bell-crank lever 67, and links 64, 66 and 68 to actuate the slide 69 for discharging a surplus half dollar from the receptacle D, and the slide 65 for delivering a half dollar from said receptacle D to the change spout 34. This action is simultaneous with the actuation of the register 76 and the upper slide 79 upon energization of the solenoid 10 by closure of the switch branch $e^1$, and the above-described actuation of the slides 41 and 46 upon energization of the solenoid 7 by the closure of the switch branch $e^3$, and of the slides 56 and 60 upon energization of the solenoid 8 by closure of the switch branch $e^4$.

From the above description, it will be clear that my invention provides a simple and compact construction, which will act with certainty to register all fares and to deliver the correct change for various coins of different denominations deposited therein.

I have illustrated and described preferred and satisfactory constructions, but changes could be made within the spirit and scope of my invention.

I claim:—

1. In an automatic change device, the combination of a series of independent receptacles for coins of different denominations, pairs of slides in said several receptacles for discharging coins therefrom, electro-magnetic means for actuating said slides of the respective receptacles, and switches actuated by the insertion of coins in the respective receptacles for controlling said electro-magnetic means for actuating the slides of other of said receptacles.

2. In an automatic change device, the combination of a series of independent receptacles for coins of different denominations, pairs of slides in said several receptacles for discharging coins therefrom, a common electro-magnetic means for simultaneously actuating said slides of the respective receptacles, and switches actuated by the insertion of coins in the respective receptacles for controlling said electro-magnetic means for actuating the slides of other of said receptacles.

3. In an automatic registering and change device, the combination of a series of independent receptacles for coins of different denominations, a spout for receiving change from said several receptacles, independent slides in said several receptacles for discharging change and surplus coins therefrom, electro-magnetic means for actuating said slides, and switches actuated by the insertion of coins in the respective receptacles for controlling said electro-magnetic means for actuating the slides of other of said receptacles.

4. In an automatic change device, the combination of a series of independent receptacles for coins of different denominations, slides in said several receptacles for discharging change therefrom, a fixed shaft, a series of independent levers rotatably mounted on said shaft, connections between said levers and slides, means for axially adjusting said several levers on said shaft, electro-magnetic means for actuating said levers, and switches actuated by the insertion of coins in the respective receptacles for controlling said electro-magnetic means for actuating the slides of other of said receptacles.

5. In an automatic change device, the combination of a series of independent receptacles for coins of different denominations, slides in said several receptacles for discharging change therefrom, a fixed shaft, a series of externally threaded sleeves rotatably mounted on said shaft, levers adjustably screwed on said threaded sleeves, links connecting said levers and slides, electro-magnetic means for actuating said levers, and switches actuated by the insertion of coins in the respective receptacles for controlling said electro-magnetic means for actuating the slides of other of said receptacles.

6. In an automatic registering and change device, the combination of a series of independent receptacles for coins of different denominations, independent slides in said several receptacles for discharging change and surplus coins therefrom, separate electro-magnetic means for independently actuating said slides for discharging change and surplus coins from one of said receptacles, independent electro-magnetic means for simultaneously actuating both slides in other of said receptacles, and switches actuated by the insertion of coins in said receptacles for controlling the action of said electro-magnetic means.

7. In an automatic registering and change device, the combination of a series of independent receptacles for coins of different denominations, a spout for receiving change from said receptacles, independent slides in said several receptacles for discharging change and surplus coins therefrom, a register, electro-magnetic means for simultaneously actuating said register and slide for discharging surplus coins from the receptacle for coins of the lowest denomination, electro-magnetic means for independently actuating the slide for discharging change from said receptacle for coins of the lowest denomination, independent electro-magnetic means for simultaneously actuating both slides in other of said receptacles, and switches actuated by the insertion of coin in said receptacles for controlling the action of said electro-magnetic means.

8. In an automatic registering and change device, the combination of a series of independent receptacles for coins of different denominations, a supply chute for each receptacle provided with a slotted wall, resilient members yieldingly bearing against said slotted walls, switches normally maintained open by said resilient members, levers pendent in said chutes in engagement with said resilient members for shifting the latter to close said switches upon the insertion of a coin in the respective chutes, and electro-magnetic means controlled by said switches for discharging coins from said receptacles.

In testimony whereof, I affix my signature in presence of two witnesses.

DAVID GAIBIS.

Witnesses:
   JAS. A. CHAMBERS,
   JOHN P. LOCKHURST.